(12) United States Patent
Georgiev et al.

(10) Patent No.: US 11,595,248 B2
(45) Date of Patent: Feb. 28, 2023

(54) SCALABLE NOTIFICATION DELIVERY FOR NETWORKED COMPUTING ENVIRONMENTS

(71) Applicant: VMware, Inc., Palo Alto, CA (US)

(72) Inventors: Kostadin Georgiev, Sofia (BG); Deyan Popov, Sofia (BG); Lyubomir Tzvetkov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/129,999

(22) Filed: Dec. 22, 2020

(65) Prior Publication Data

US 2022/0200845 A1    Jun. 23, 2022

(51) Int. Cl.
*H04L 41/0686* (2022.01)
*H04L 41/50* (2022.01)

(52) U.S. Cl.
CPC ........ *H04L 41/0686* (2013.01); *H04L 41/508* (2013.01)

(58) Field of Classification Search
CPC . H04L 41/0686; H04L 41/508; H04L 51/066; H04L 51/18; H04L 67/306; H04L 51/00; H04L 51/12; H04L 51/14; G06F 9/00
See application file for complete search history.

(56) References Cited

U.S. PATENT DOCUMENTS

| | | | | |
|---|---|---|---|---|
| 2005/0021622 | A1* | 1/2005 | Cullen | H04L 67/568 709/204 |
| 2009/0055532 | A1* | 2/2009 | Oh | H04L 67/54 709/225 |
| 2009/0164293 | A1* | 6/2009 | Coley | G06Q 10/109 705/7.13 |
| 2010/0217615 | A1* | 8/2010 | Brown | H04L 67/54 455/410 |
| 2012/0185561 | A1* | 7/2012 | Klein | H04L 67/145 709/217 |
| 2015/0120852 | A1* | 4/2015 | Bhat | H04L 51/226 709/207 |
| 2019/0260844 | A1* | 8/2019 | Wagenknecht | H04L 67/141 |
| 2021/0044549 | A1* | 2/2021 | Renjith | G06F 16/9536 |
| 2021/0298033 | A1* | 9/2021 | Nishiyama | H04W 8/20 |

* cited by examiner

*Primary Examiner* — Brian Whipple
*Assistant Examiner* — James Ross Hollister
(74) *Attorney, Agent, or Firm* — Thomas Horstemeyer, LLP (57) ABSTRACT

Disclosed are various embodiments for scalable notification deliveries in computing environments. A subscription request is transmitted along with a user identifier, a service identifier, a subscription identifier, and a channel identifier. Notifications are communicated through a notification multiplexing channel between two nodes of a computing environment. The notification multiplexing channel includes notifications multiplexed by subscription identifiers. The notification multiplexing channel corresponds to the channel identifier. A notification corresponding to the subscription identifier is identified and provided to a client computing device associated with the user identifier.

20 Claims, 5 Drawing Sheets

SCALABLE NOTIFICATION DELIVERY FOR NETWORKED COMPUTING ENVIRONMENTS

BACKGROUND

Enterprises can employ datacenters in order to provide compute, memory, storage, network, and other resources organized into multiple nodes across the computing environment. As the number of nodes utilized by enterprise datacenters increases, the communication load can increase to levels that are difficult to manage. For example, the workloads executed on the nodes can include services that can send notifications to other nodes or to clients. Multiple clients can be subscribed to multiple services across any number of the nodes. The existing technologies distribute message broker-based systems that require each of the federated node services to publish its notifications into a topic or queue in the message broker. Then the subscriber clients have to subscribe to the topics or services from the broker.

However, these technologies require the message broker to filter the notifications for each subscriber based on its permissions. Doing this is impractical. For example, for services that limit permissions, existing technologies can require copying the authorization logic and inventory objects of each service into the message broker. Another drawback of existing systems is that each message broker multicasts or replicates all messages to its peer brokers in the cluster. This can require deployment of a broker server in each node or deployment of a whole set of new nodes for notifications. Since the existing systems are inefficient and unscalable, more accurate notification delivery technologies are needed.

BRIEF DESCRIPTION OF THE DRAWINGS

Many aspects of the present disclosure can be better understood with reference to the following drawings. The components in the drawings are not necessarily to scale, with emphasis instead being placed on clearly illustrating the principles of the disclosure. Moreover, in the drawings, like reference numerals designate corresponding parts throughout the several views.

DETAILED DESCRIPTION

Disclosed are various approaches for scalable notification delivery in a networked computing environment. Datacenters and other networked environments can include various host machines, or servers, that provide a central processing unit (CPU), memory, disk, and network resources for workloads that can be deployed on the host machines. Enterprises can employ networked environments in order to provide compute, memory, storage, network, and other resources organized into multiple nodes across the computing environment. For example, the nodes can include services that can send notifications to client devices and interfaces. Multiple clients can be subscribed to multiple services across any number of the nodes. Existing technologies are unscalable and inefficient, and can require copying service permissions data including logic and inventory objects of each service into a message broker. Existing technologies also multicast all messages to all peer brokers. This can require deployment of a broker server in each node or deployment of a whole set of new nodes for notifications.

However, examples of the disclosure provides a resource-efficient and scalable mechanism for delivering notifications, including change data notifications, from publisher services across a scalable number of nodes. For example, the mechanisms can include a set of notification services deployed to the nodes of a networked environment for scalable notification delivery through unique node-to-node notification multiplexing channels.

Figure 1:
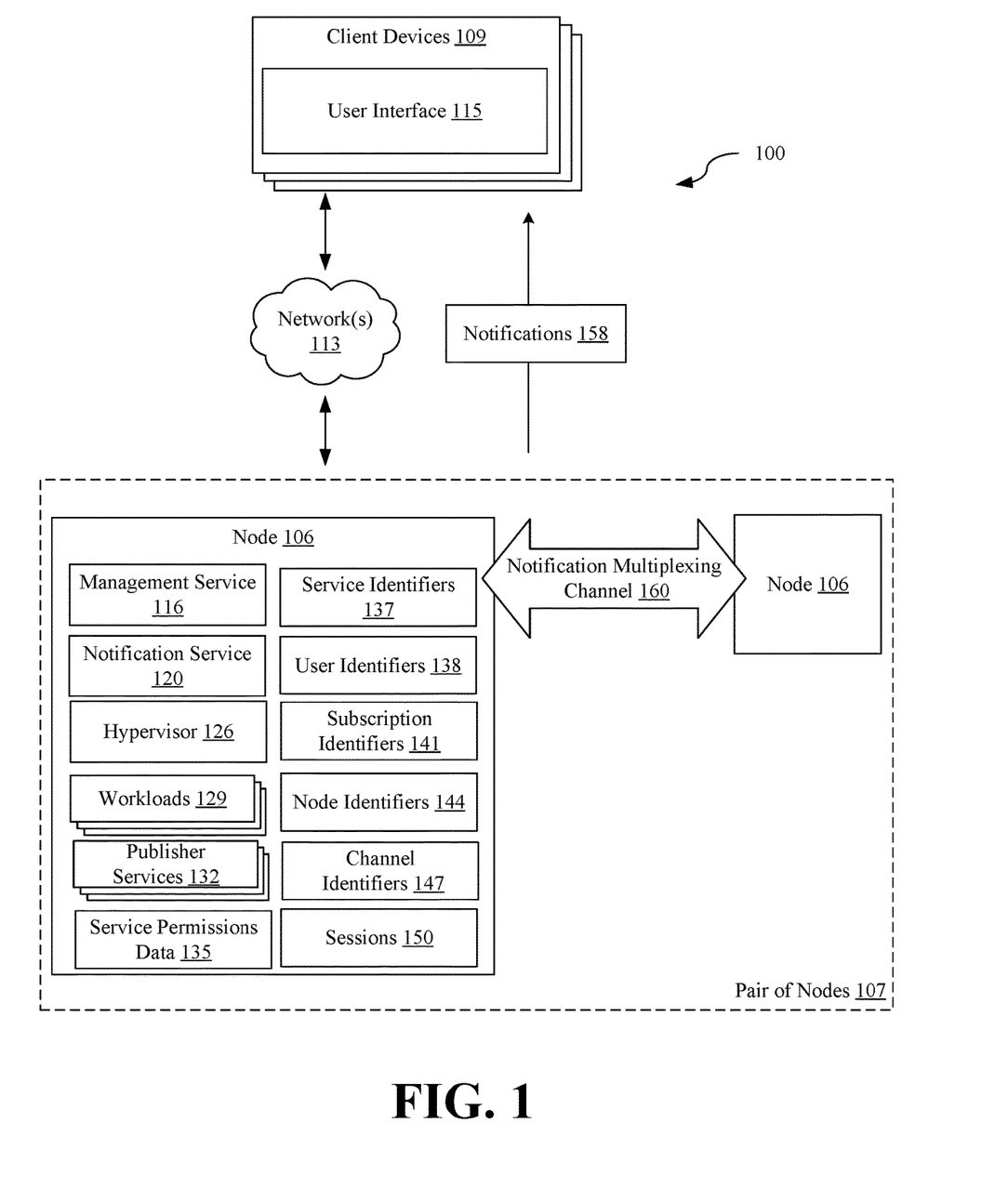
FIG. 1 is a drawing of an example of a networked environment according to various embodiments of the present disclosure.

FIG. 1 depicts a networked environment 100 according to various embodiments. The networked environment 100 includes one or more nodes 106 and one or more client devices 109, which are in data communication with each other via a network 113. The network 113 can include wide area networks (WANs) and local area networks (LANs). These networks 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The nodes 106 can include a physically or logically defined set of hardware that operates as a computing device. For example, a node 106 can include a server computer or any other system providing computing capability. In some instances, the nodes 106 can be representative of a plurality of computing devices used in a distributed computing arrangement, such as a server bank, computer bank, or combination of multiple server banks or computer banks. The nodes 106 can correspond to a set of federated server nodes of the networked environment 100. A federation of nodes can refer to a cluster or group of nodes that are logically grouped and associated for shared identity management service authentication and other functions. In some examples, a node 106 can refer to a hardware host.

The node 106 can provide an operating environment for one or more workloads 129. Accordingly, a node 106 may have a hypervisor 126 installed to manage and coordinate the execution of any workloads 129 hosted by the node 106. To assist the operation of the hypervisor 126 or the workloads 129 hosted by the node 106, the node 106 may also maintain a storage cache.

The hypervisor 126, which may sometimes be referred to as a virtual machine monitor (VMM), is an application or software stack that allows for creating and running virtual machines. Accordingly, a hypervisor 126 can be configured to provide guest operating systems with a virtual operating platform, including virtualized hardware devices or resources, and to manage the execution of guest operating systems within a virtual machine execution space provided on the node 106 by the hypervisor 126. In some instances, a hypervisor 126 may be configured to run directly on the hardware of the node 106 in order to control and manage the hardware resources of the node 106 provided to the workloads 129 resident on the node 106. In other instances, the hypervisor 126 can be implemented as an application executed by an operating system executed by the node 106, in which case the workload 129 may run as a thread, task, process or virtual machine of the hypervisor 126 or operating system. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

When using a plurality of computing devices in a distributed computing arrangement, individual nodes 106 may be located in a single installation or may be distributed across multiple installations. In some cases, the networked environment can be referred to as a hybrid federated environment that includes federated nodes that are supported by nodes 106 that include local or on-premises nodes 106, as well as cloud-based nodes 106 that are accessed over a public wide area network or the Internet.

The management service 116 can provide an administrative interface for configuring the operation of individual components in the networked environment 100. For instance, the management service 116 can provide an administrative interface for the management service 116. As an example, the management service 116 can provide a user interface to allow an administrative user to request a predicted amount of time for a maintenance window that would begin at a user specified time. Accordingly, the management console can correspond to a web page or a web application provided by a web server hosted in the computing environment 100 in some implementations. In other implementations, however, the management console can be implemented as a dedicated or standalone application.

Also, various data can be stored in a data store of one or more of the nodes 106. A data store can be representative of relational databases, object-oriented databases, hierarchical databases, hash tables or similar key-value data stores, as well as other data storage applications or data structures. The data stored is associated with the operation of the various applications or functional entities described below. This data can include the management service 116, a notification service 120, the hypervisor 126, workloads 129, publisher services 132, service permissions data 135, user identifiers 138, subscription identifiers 141, node identifiers 144, and notification multiplexing channel identifiers 147.

Although the nodes 106 are depicted and discussed as separate devices, one or more of these devices could be executed as a workload 129 hosted by another computing device. For example, the functionality provided by the management device 103 could be implemented using a workload 129 executed by a node 106 in a datacenter or similar computing environment. Likewise, one or more network storage devices could be implemented as workloads 129 operating on a node 106.

The notification service 120 can refer to a service that manages notifications 158 that are published by publisher services 132. Accordingly, the notification service 120 can be referred to as a notification management service 120. A single notification service 120 can be executed by each node 106 of the federated networked environment 100. Since the networked environment 100 can have a scalable number of nodes 106, there can be an equivalent number of notification services 120. The set of notification services 120 can work in concert to provide a scalable notification delivery solution as described in further detail below.

The publisher services 132 can publish or promulgate notifications 158. The notifications 158 can refer to change data notifications, as well as other notifications and messages that are provided by the publisher services 132. Since the publisher services 132 can publish notifications 158, the publisher services 132 can also be referred to as notification publisher services 132. A single node 106 can include multiple publisher services 132. In some cases, a publisher service 132 can refer to an instance of a particular service that can be executed by any number of the nodes 106 of the networked environment 100. A user of a client device 109 can access a pane of glass or user interface 115 to subscribe to a particular publisher service 132 on a specified node 106. The user interface 115 can be generated in conjunction with a workload 129 and accessed through a browser or other application executed on the client device 109. Transmitting notification 158 to the client device 109 can include transmitting notifications 158 to a node 106 or device processing the workload 129 in a manner that it can be accessed by a user of the client device 109.

A publisher service 132 can provide notifications 158 that are subject to an access control list or other permissions logic that can vary based on a user account or user identifier 138. Each publisher service 132 can expose an application programming interface (API) that can be called or accessed by a client device 109 or a node 106. The API can include a representational state transfer (REST) API or another API. A publisher service 132 can be associated with a particular service identifier 137. In other cases, the publisher service 132 can be otherwise identified based on the API call or subscription request.

The service permissions data 135 can include permissions logic and permissions objects that are utilized by the publisher service 132 to determine which notifications 158 should be provided or published for a particular user based on user identifier 138, user account, and security context. In various situations, the user identifiers 138 can be provided as a security context, or a security context associated with a client device 109 and a user account with the management service 116 can be identified based on the user identifier 138. A security context can include information that can affect access privileges for a user and a client device 109. For example, a security context can include the user identifier 138 of the user account, a user group, a role, privileges or a privilege level, and other information. The security context can also include, and can be identified using, the user identifier 138, a device identifier of the client device 109, a network identifier of a network to which the client device 109 is connected, and other aspects of the user account and the client device 109.

The set of notification services 120 can preserve security by forwarding appropriate user identifiers 138 and/or security contexts with a contacted gateway node 106 along with a REST API call to a target publisher service 132 on a target node 106. This can allow the publisher service 132 on any node to process API calls while also enforcing the return or response to the API call to be multiplexed across a specified notification multiplexing channel 160 according to its channel identifier 147. The notifications 158 can be multiplexed according to subscription identifiers 141. To enable this, an unaltered notification API call can be forwarded and the channel identifier 147 and subscription identifier 141 can be passed as parameters. This also allows for reusing the user or client session 150 and security context with the gateway node 106 and gateway notification service 120, so that the client's security context can reach the notification service 120 of the target node 106. The target publisher service 132 to filter the notifications 158 according to the service permissions data 135 in view of the security context and session 150.

The subscription identifiers 141 can uniquely identify a particular subscription. A subscription identifier 141 can be unique to a combination of a user identifier 138, a publisher service 132, and a node identifier 144 specified in a subscription request or notification API call. The node identifiers 144 can be unique identifiers that uniquely identify a node 106 or a node of a federated environment.

A notification API call can include a subscription API call that initiates a subscription to notifications 158 from a publisher service 132, which can be maintained so that the publisher service 132 provides notifications 158 automatically thereafter. The notification API call can also include an API call that retrieves currently available notifications from the publisher service 132, for example, in an HTTP streaming paradigm. A notification service 120 can maintain a subscription by periodically polling the publisher service 132 for new notifications 158 using an API call, for example, in an HTTP long polling paradigm.

The channel identifiers 147 can uniquely identify a node-to-node notification multiplexing channel 160 between a pair of nodes 107. The set of notification services 120 can ensure that a single pair of nodes 107 includes only a single notification multiplexing channel 160. As a result, a notification multiplexing channel 160 can include a multiplexed stream of notifications from multiple publisher services 132 for multiple users. To enable this, the notification services 120 can multiplex notifications 158 according to multiple subscription identifiers 141 corresponding to multiple different users and/or services. In some cases, a notification multiplexing channel 160 can use a Web Socket protocol.

The WebSocket connection can be established initially from an instance of a notification service 120 on a gateway node 106 inside the customers private datacenter to a notification service 120 instance on a node 106 inside a public cloud on the Internet. Once established, the notification multiplexing channel 160 enables pushing notifications 158 from the public cloud to nodes 106 in the private datacenter, even if these privately-hosted on-premises nodes 106 are behind a firewall that forbids calling the privately-hosted nodes 106 from the Internet.

Client or user sessions 150 can be created when a user logs in or authenticates for access to the user interface 115 through the client device 109. The nodes 106 can create session-based channels to transmit notifications 158 to the client device 109. The session-based channel can be identified using a channel identifier 147. In some cases, the session-based channel can use a WebSocket protocol.

Existing technologies can require the number of necessary outgoing connections from a single node 106 to be $|U| \times |M| \times |N|$, where U is the number of concurrent users/clients, M the number of federated nodes 106 (e.g., other than the node under consideration) and N the number of notification publisher services on each node 106. However, the present mechanisms can reduce the number of connections to less than or equal to $|M|$, since notifications 158 from all services and for all users can be multiplexed through the notification multiplexing channels 160.

Figure 2:
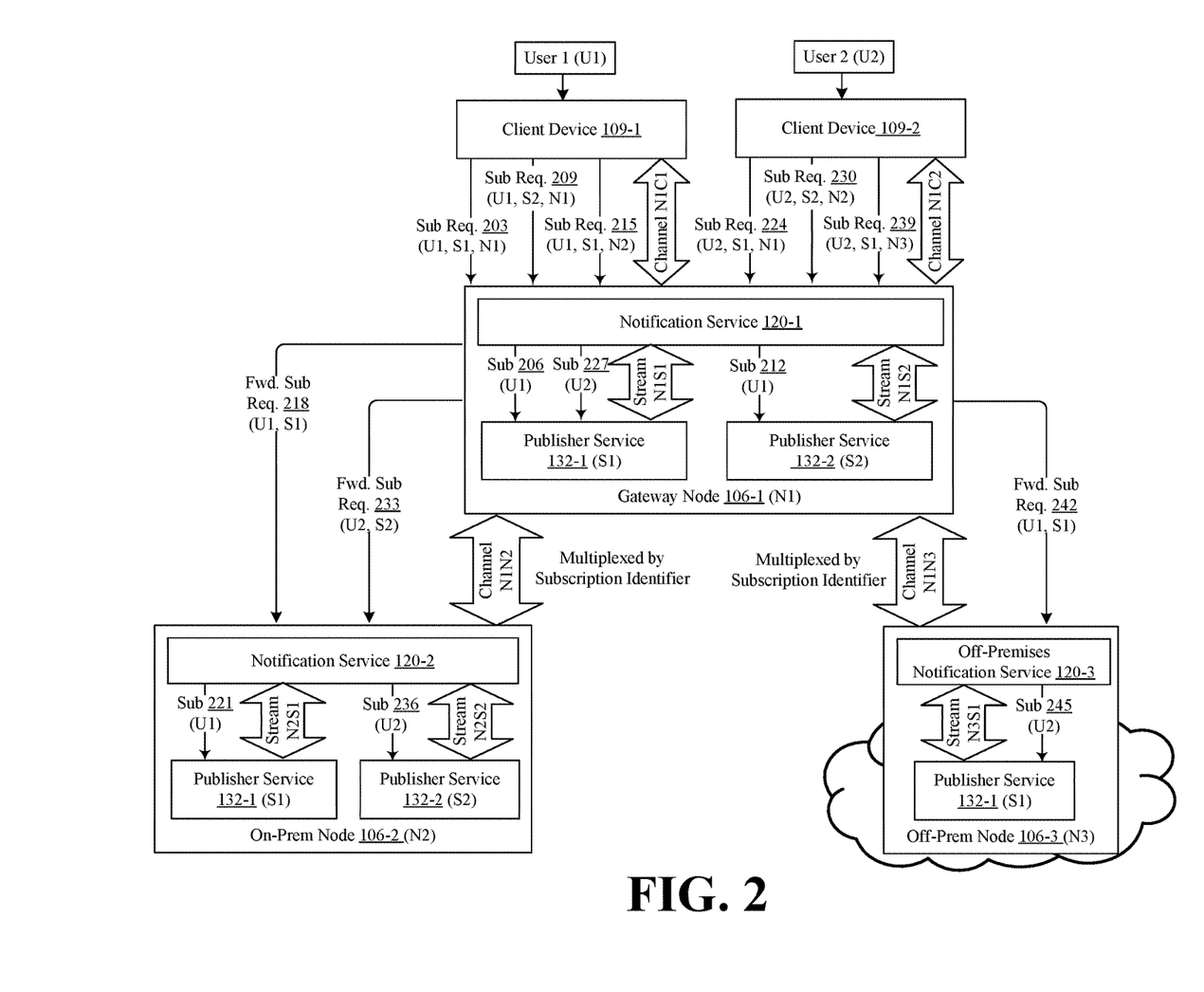
FIG. 2 is a drawing of an example of the operation of notification services deployed in the networked environment according to various embodiments of the present disclosure.

FIG. 2 shows the operation of notification services 120-1, 120-2, and 120-3, deployed in the networked environment 100. Generally, this figure provides an example of functionalities performed by the notification services 120. However, some of the functionalities described can be performed by other components of the networked environment 100. In this example, a user 1 and a user 2 can respectively access client device 109-1 and client device 109-2. User identifiers U1 and U2 can refer to user identifiers 138 corresponding to user 1 and user 2.

The notification service 120-1 is executed on node 106-1, the notification service 120-2 is executed on node 106-2, and the notification service 120-3 is executed on node 106-3. Node identifiers N1, N2, and N3 can refer to respective node identifiers 144. The notification service 120-1 can act as a gateway for the client devices 109. The notification service 120-1 can be referred to as a gateway notification service, and node 106-1 can be referred to as gateway node 106-1. In some cases, the nodes 106-1, 106-2, and 106-3 can form a hybrid federated environment where nodes 106-1 and 106-2 are on-premises nodes that are networked and accessed through a private local area network or private wide area network, while node 106-3 is an off-premises node that is accessed through a local wide area network or the Internet.

Node 106-1 can include the notification service 120-1, as well as an instance of publisher service 132-1 and the publisher service 132-2. Publisher services 132-1 and 132-2 can refer to publisher services 132. Publisher service 132-1 can be identified using service identifier S1, while publisher service 132-2 can be identified using service identifier S2. The service identifiers S1 and S2 can refer to service identifiers 137.

A subscription request 203 can include the user identifier U1, the service identifier S1, and the node identifier N1. The subscription request 203 can request a subscription to the instance of publisher service 132-1 that is executed on node 106-1. Client device 109-1 can transmit the subscription request 203 to notification service 120-1 of node 106-1. Node 106-1 can be considered the target node of the subscription request 203. Publisher service 132-1 can be considered the target service of the subscription request 203.

The notification service 120-1 can process the subscription request 203, determine that the target node is the local node 106-1 based on the node identifier N1, which can be passed as a parameter. The notification service 120-1 can further determine that the target service is the publisher service 132-1 based on the service identifier S1, which can be passed as a parameter. The notification service 120-1 can also generate a subscription identifier 141 for the subscription request 203. The subscription identifier 141 can be stored in a table, hash table, or other data structure mapped to the user identifier U1, service identifier S1, node identifier N1, as well as a channel identifier 147 for the session-based channel N1C1. The subscription identifier 141 can be a globally unique identifier that is unique for the combination of the user identifier U1, the service identifier S2, and the node identifier N1.

The notification service 120-1 can subscribe to the target publisher service 132-1. For example, the notification service 120-1 can communicate subscription instructions 206 that include a notification API call from the subscription request 203 to the publisher service 132-1. The notification API call can include a user identifier U1, and in some cases can include a security context of the client device 109-1 and the user 1. In other cases, the publisher service 132-1 can identify the security context based on the user identifier U1 and a user account with a management service 116. The publisher service 132-2 can generate notifications 158. The publisher service 132-1 can generate a number of notifications 158, and can provide a filtered subset of these notifications 158 in the notification stream N1S1 to the notifications service 120-1 local to this instance of the publisher service 132-1.

The filtered subset of notifications can include those that are approved for the user 1 according to publisher-service-specific service permissions data 135 for the publisher service 132-1. The filtered subset of notifications can also include notifications 158 that are approved for users identified in previous subscription requests or notification API calls, according to publisher-service-specific service permissions data 135. In some cases, the notification service 120-1 maintains a record of each subscription according to subscription identifier and polls the publisher service 132-1 for corresponding notifications. The notification service 120-1 can maintain the notification stream N1S1 using HTTP long-polling against a notification API exposed by the publisher service 132-1.

The notification service 120-1 can provide the notifications to the user 1 by establishing a notification channel N1C1 between the gateway node 106-1 and a computing device corresponding to the client device 109-1. The notification channel N1C1 can include a session-based channel that can be identified using a channel identifier 147.

A subscription request 209 can include the user identifier U1, the service identifier S2, and the node identifier N1. The subscription request 209 can request a subscription to the instance of publisher service 132-2 that is executed on node 106-1. Client device 109-1 can transmit the subscription request 209 to notification service 120-1 of node 106-1. Node 106-1 can be considered the target node of the subscription request 209. Publisher service 132-2 can be considered the target service of the subscription request 209. A single client or user can subscribe to multiple publisher services 132 on a single node 106-1.

The notification service 120-1 can process the subscription request 209, determine that the target node is the local node 106-1, and subscribe to the target publisher service 132-2. The notification service 120-1 can also generate a subscription identifier 141 for the subscription request 209. The subscription identifier 141 can be stored in a table, hash table, or other data structure mapped to the user identifier U1, service identifier S2, node identifier N1, as well as a channel identifier 147 for the session-based channel N1C1. The subscription identifier 141 can be a globally unique identifier unique for the combination of the user identifier U1, the service identifier S2, and a node identifier N1.

In order to subscribe to the publisher service 132-2, the notification service 120-1 can communicate subscription instructions 212 that include a notification API call from the subscription request 209 to the publisher service 132-2. The notification API call can include user identifier U1, and in some cases can include a security context of the client device 109-1 and the user 1. The publisher service 132-2 can provide a filtered subset of these notifications 158 in the notification stream N1S2 to the notifications service 120-1 local to this instance of the publisher service 132-2.

The filtered subset of notifications can include those that are approved for the user 1 according to publisher-service-specific service permissions data 135 for the publisher service 132-2. The filtered subset of notifications can also include notifications 158 that are approved for users identified in previous subscription requests or notification API calls, according to publisher-service-specific service permissions data 135. In some cases, the notification service 120-1 maintains a record of each subscription according to subscription identifier and maintains notification streams with the publisher services 132 for corresponding notifications. The notification service 120-1 can maintain the notification stream N1S2 using HTTP streaming. However, in other examples, request-based long polling can be used.

The notification service 120-1 can provide the notifications 158 from both publisher services 132-1 and 132-2 to the user 1 through the notification channel N1C1 between the gateway node 106-1 and the client device 109-1. The notification service 120-1 can collect notifications 158 from multiple publisher services 132 on a single node and multiplex or otherwise provide these notifications 158 to the client device 109-1 through the notification channel N1C1.

A subscription request 215 can include the user identifier U1, the service identifier S1, and the node identifier N2. The subscription request 215 can request a subscription to the instance of publisher service 132-1 that is executed on node 106-2. Client device 109-1 can transmit the subscription request 215 to notification service 120-1 of node 106-1, which is the gateway for the client device 109-1. Although the subscription request 215 is transmitted through the gateway node 106-1, the node 106-2 can be the target node of the subscription request 215. Publisher service 132-1 can be considered the target service of the subscription request 215. A single client or user can subscribe to multiple publisher services 132 on multiple on-premises nodes 106-1 and 106-2.

The notification service 120-1 can generate a subscription identifier 141 for the subscription request 215. The subscription identifier 141 can be stored in a table, hash table, or other data structure mapped to the user identifier U1, service identifier S1, node identifier N1, as well as a channel identifier 147 for the session-based channel N1C1 and a channel identifier 147 for the notification multiplexing channel N1N2. The notification multiplexing channel N1N2 can be a notification multiplexing channel 160 between nodes 106-1 and 106-2. This can allow the notification service 120-2 to identify the notification multiplexing channel N1N2 based on subscription identifier 141, and the notification service 120-2 to identify the session-based channel N1C1 based on the subscription identifier 141. The subscription identifier 141 can be a globally unique identifier unique for the combination of the user identifier U1, the service identifier S2, and the node identifier N1. The notification service 120-1 can communicate the mapping of identifiers to the notification service 120-2.

The notification service 120-1 can process the subscription request 215 and determine that the target node is the remote node 106-2. The notification service 120-1 can transmit a forwarded subscription request 218 to the notification service 120-2 of the node 106-2. The forwarded subscription request 218 can include user identifier U1, as well as service identifier S1 and a channel identifier 147 for the notification multiplexing channel 160 between nodes 106-1 and 106-2. The forwarded subscription request 218 can include a notification API call from the subscription request 215, which can include the user identifier U1. Service identifier S1 and the channel identifier 147 for the notification multiplexing channel 160 can be passed as a parameter or specified by the notification API call.

The notification service 120-2 can process the forwarded subscription request 218 and determine that the target service is the publisher service 132-1 based on the service identifier S1. The notification service 120-2 can subscribe to the target publisher service 132-1. For example, the notification service 120-2 can communicate subscription instructions 221 that include the notification API call to the publisher service 132-1. The notification API call can include user identifier U1, and in some cases can include a security context of the client device 109-1 and the user 1. The publisher service 132-1 on this node 106-2 can generate notifications 158. The publisher service 132-1 can provide a filtered subset of these notifications 158 in the notification stream N2S1 to the notifications service 120-2 local to this instance of the publisher service 132-1.

The filtered subset of notifications can include those that are approved for the user 1 according to publisher-service-specific service permissions data 135 for the publisher service 132-1. The filtered subset of notifications can also include notifications 158 that are approved for users identified in previous subscription requests or notification API calls, according to publisher-service-specific service permissions data 135. The notification service 120-2 can maintain a record of each subscription according to the subscription identifier 141 and can maintain notification streams with the publisher services 132 for corresponding notifications 158. The notification service 120-2 can maintain the notification stream N2S1 using HTTP streaming or by periodically transmitting a request according to a long polling schedule.

Notification services 120-1 and 120-2 can identify a lack of a notification multiplexing channel between these nodes 106-1 and 106-2, and can establish the notification multiplexing channel N1N2. The notification multiplexing channel N1N2 can be a unique or singular notification channel established between the node 106-1 and the node 106-2. The network or set of notification services 120 can ensure that the notification multiplexing channel N1N2 is a unique or singular notification multiplexing channel between the node 106-1 and the node 106-2. The notification service 120-2 can multiplex notifications 158 from the publisher service 132-1 as well as notifications 158 from publisher service 132-2 according to the subscription identifier 141 and transmit them across the notification multiplexing channel N1N2. The notification service 120-1 can demultiplex notifications 158 received through the notification multiplexing channel N1N2. The notification service 120-1 can then identify the channel N1C1, client device 109-1, and user 1 based on the subscription identifier 141 for a demultiplexed notification 158, and transmit the notification 158 over the session-based notification channel N1C1.

A subscription request 224 can include the user identifier U2, the service identifier S1, and the node identifier N1. The subscription request 224 can be handled as discussed for the subscription request 203, except that the subscription request 224 is received from the client device 109-2 in association with the user identifier U2. The notifications 158 associated with the subscription identifier 141 for this request will be associated with the notification stream or channel N1C2 between the node 106-1 and client device 109-2, as well as the user identifier U2. A single notification stream N1S1 can include notifications 158 from publisher service 132-1 based on the subscription instructions 206 and subscription instructions 227, or separate publisher-service-to-notification-service streams can be maintained.

A subscription request 230 can include the user identifier U2, the service identifier S2, and the node identifier N2. The subscription request 230 can be handled as discussed for the subscription request 215, except that the subscription request 230 is received from the client device 109-2 in association with the user identifier U2 and the service identifier S2. The notifications 158 associated with the subscription identifier 141 for this request will be mapped to the notification channel N1C2 between the node 106-1 and client device 109-2, as well as the user identifier U2 and the service identifier S2. Once the notification service 120-1 transmits the forwarded subscription request 233, the notification service 120-2 can provide subscription instructions 236 to the publisher service 132-2. Since the channel N1N2 is already established, the notification service 120-2 can multiplex notifications 158 for both users 1 and 2, as well as publisher services 132-1 and 132-2 into the existing notification multiplexing channel N1N2. The notification stream N2S2 can include notifications 158 for the subscription instructions 236.

A subscription request 239 can include the user identifier U2, the service identifier S1, and the node identifier N3. The subscription request 239 can be handled as discussed for the subscription request 215, except that the subscription request 239 is received from the client device 109-2 in association with the user identifier U2, and the node identifier N3. The notifications 158 associated with the subscription identifier 141 for this request will be mapped to the notification channel N1C2 between the node 106-1 and client device 109-2, as well as the user identifier U2. Once the notification service 120-1 transmits the forwarded subscription request 242 to notification service 120-3 of node 106-3, the notification service 120-3 can provide subscription instructions 245 to the publisher service 132-1. Notification service 120-3 can multiplex notifications 158 for this subscription, as well as previous subscriptions into the notification multiplexing channel N1N3. The notification stream N3S1 can include notifications 158 for the subscription instructions 245.

The on-premises nodes 106-1 and 106-2 can be behind a firewall that forbids calling these nodes from the Internet. In some cases, this can prevent subscription requests and notification multiplexing channel generation or requests that originate from the Internet. However, since the notification service 120-1 is internal to the firewall, and the notification service 120-3 is not behind such a firewall, the notification service 120-1 can establish the notification multiplexing channel N1N3 between on-premises node 106-1 and a cloud based node 106-3. Once the notification multiplexing channel N1N3 is established, for example, using a WebSocket protocol, this can enable the notification service 120-3 to push notifications and subscription requests from the Internet to notification services 120 of on-premises nodes 106-1 and 106-2 behind the firewall.

Figure 3:
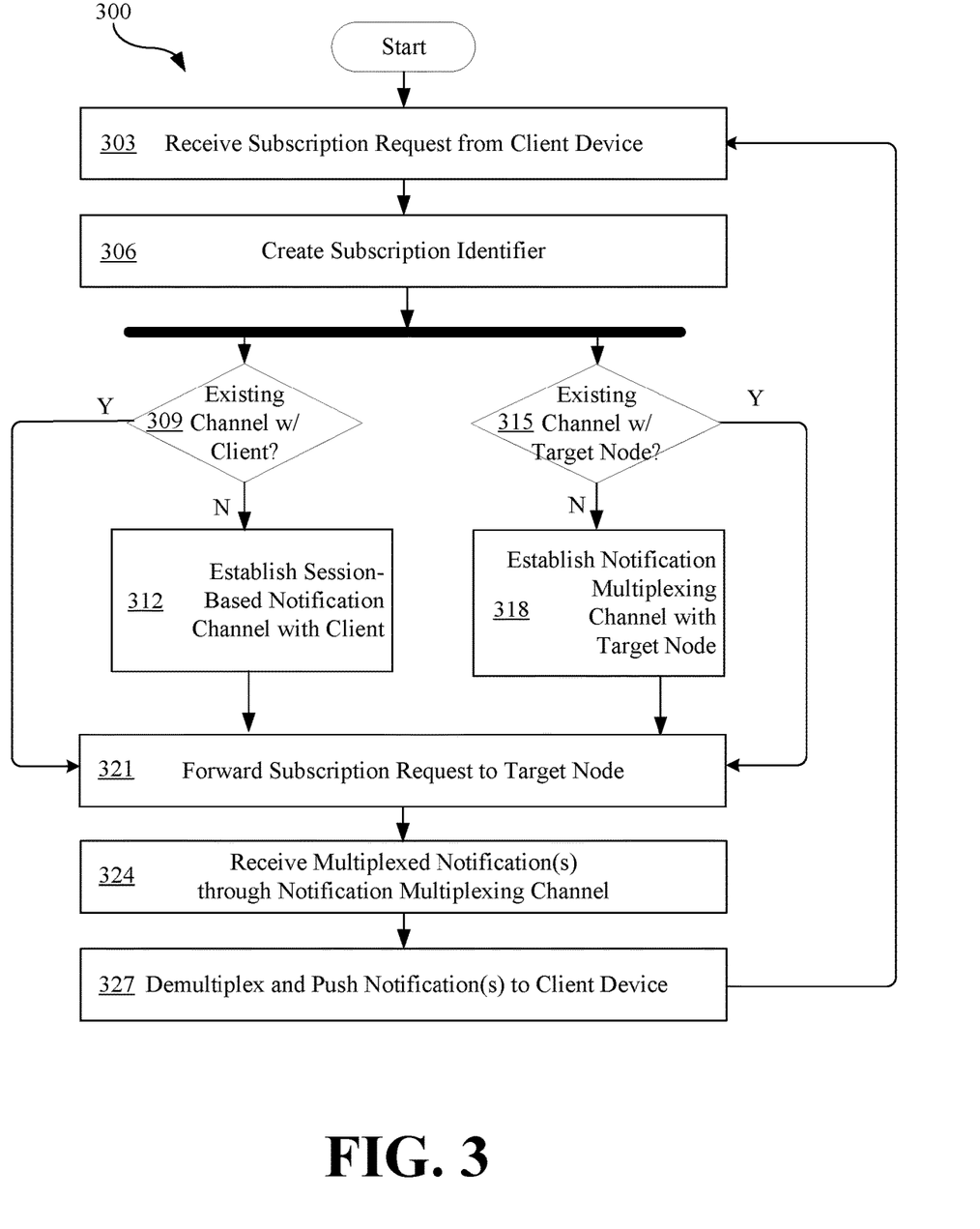
FIG. 3 is a flowchart illustrating an example of functionality implemented by various embodiments of the present disclosure.

FIG. 3 shows a flowchart 300 illustrating functionality implemented by a notification service 120. Generally, the flowchart 300 describes the operation of a set or network of notification services 120. While the flowchart 300 is described from the perspective of a gateway notification service 120 of a gateway node 106, functionalities discussed can be provided by other components including other notification services 120.

In step 303, the gateway notification service 120 can receive a subscription request from a client device 109. The client device 109 can call the gateway notification service 120 instance to subscribe for notifications 158 from a target publisher service 132 on a target node 106 participating in a federation. The subscription request can include a user identifier 138, a service identifier 137, and a node identifier 144. The user identifier 138 can be mapped to a user account with a management service 116, as well as the client device 109. The service identifier can identify a target publisher service 132. Instances of the target publisher service 132 can be executed on multiple different nodes 106. The node identifier can identify a target node 106 on which the targeted instance of the publisher service 132 is executed.

In step 306, the gateway notification service 120 can create a subscription identifier 141. The subscription identifier 141 can be a unique identifier that is unique to the subscription request and/or a combination of the user identifier 138, service identifier 137, and node identifier 144 in the subscription request. This can enable a network or set of notification services 120 of the networked environment 100 to multiplex notifications 158 for multiple different users and multiple different publisher services 132 across a singular or unique notification multiplexing channel 160 between the gateway node 106 and the target node 106, and then identify the appropriate recipients once demultiplexed.

In step 309, the gateway notification service 120 can determine whether a session-based notification channel exists between the gateway node 106 and the client device 109. If the gateway notification service 120 identifies a lack of a session-based notification channel between the gateway node 106 and the client device 109, then the gateway notification service 120 can proceed to step 312. Otherwise, if a session-based notification channel exists between the gateway node 106 and the client device 109 then the process can proceed to step 321.

In step 312, the gateway notification service 120 can establish or create a session-based notification channel with the client device 109. A client or user session 150 can be created when a user logs in or authenticates for access to the user interface 115 through the client device 109. The gateway notification service 120 can create a session-based notification channel that is destroyed, discarded, or invalidated concurrently with an end of the session 150. The session-based notification channel can be mapped to a channel identifier 147 and can be generated using a Web-Socket protocol.

In step 315, the gateway notification service 120 can determine whether a notification multiplexing channel 160 exists between the gateway node 106 and the target node 106. If the gateway notification service 120 identifies a lack of a notification multiplexing channel 160 between the gateway node 106 and the target node 106, then the gateway notification service 120 can proceed to step 312. Otherwise, if a notification multiplexing channel 160 exists between the gateway node 106 and the target node 106, then the process can proceed to step 321. This can ensure that only a single notification multiplexing channel 160 is maintained between the gateway node 106 and the target node 106.

In step 318, the gateway notification service 120 can establish or create a notification multiplexing channel 160 with the target node 106. The gateway notification service 120 can create a notification multiplexing channel 160 in concert with a notification service 120 of the target node 106. The notification multiplexing channel 160 can be mapped to a channel identifier 147 and can be generated using a WebSocket protocol. Steps 309, 312, 315, and 318 can be performed with any timing relative to one another.

In step 321, the gateway notification service 120 can transmit a forwarded subscription request to a target node 106. The forwarded subscription request can include the client's subscription or notification API call, which can specify the user identifier 138. In some cases, the notification API call can specify a service identifier 137 or otherwise identify the target publisher service 132. The channel identifier 147 and the subscription identifier 141 can be passed as parameters. The receiving notification service 120 on the target node 106 can identify the notification multiplexing channel 160 based on the channel identifier 147, and can multiplex notifications 158 generated in response to the API call using the subscription identifier 141.

The target publisher service 132 can identify a user and security context based on a user identifier and can filter notifications 158 so that only appropriate notifications 158 that are destined for a user are multiplexed and transmitted. This can reduce bandwidth requirements when compared to systems that filter notifications using instructions on the gateway node 106, and also eliminates the need to unnecessarily duplicate service permissions data 135 across nodes 106.

In step 324, the gateway notification service 120 can receive multiplexed notifications 158 through the notification multiplexing channel 160 between the target node 106 and the gateway node 106. The multiplexed notifications 158 can be multiplexed by subscription identifiers 141. The multiplexed notifications 158 can include notifications 158 from multiple different publisher services on the target node 106, and can be destined for multiple different users. The notification payload can be opaque to the gateway notification service 120 and all notification services 120, and is not deserialized or interpreted by the notification services 120.

In step 327, the gateway notification service 120 can demultiplex multiplexed notifications 158 that are received through the notification multiplexing channel 160, and push appropriate notifications 158 to the requesting client device 109. The gateway notification service 120 can demultiplex notifications 158 according to the subscription identifier 141. The gateway notification service 120 can identify a destination endpoint such as a session-based notification channel by mapping the subscription identifier 141 to the channel identifier 147 for the session-based notification channel with the client device 109.

Figure 4:
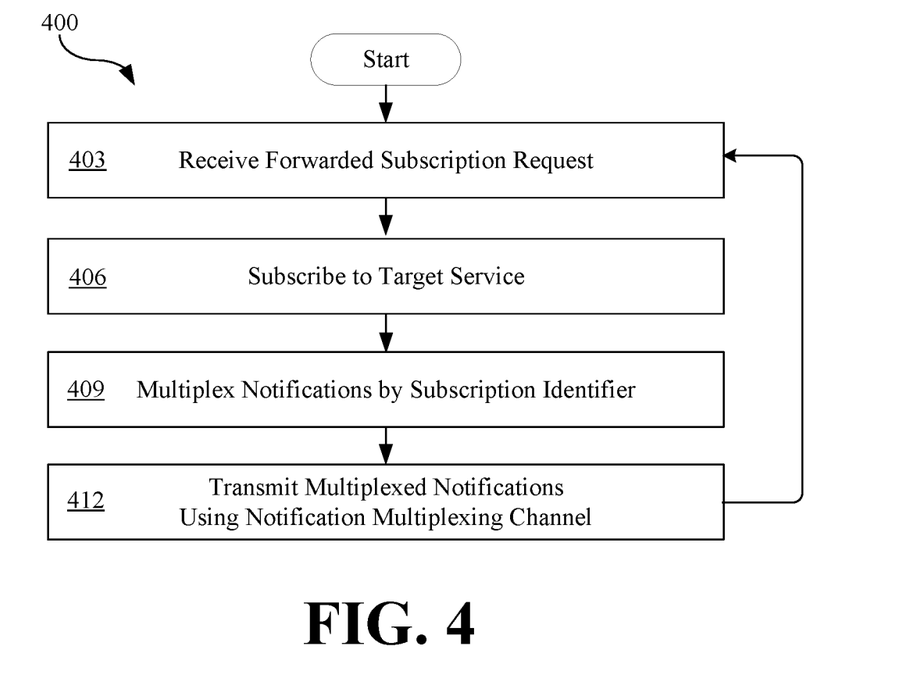
FIG. 4 is a flowchart illustrating another example of functionality implemented by various embodiments of the present disclosure.

FIG. 4 shows a flowchart 400 illustrating functionality implemented by various embodiments of the present disclosure. Generally, the flowchart 400 describes the operation a set or network of notification services 120. While the flowchart 400 is described from the perspective of a notification service 120 of a target node 106, functionalities discussed can be provided by other components including other notification services 120.

In step 403, the notification service 120 can receive a forwarded subscription request. The forwarded subscription request can include a notification API call that specifies the user identifier 138. The notification API call and/or the forwarded subscription request can specify a service identifier 137 or otherwise identify the target publisher service 132. A channel identifier 147 and a subscription identifier 141 can be received as parameters. The forwarded subscription request can be received from a gateway notification service 120 on a gateway node 106 for the client device 109 that originated the notification API call.

The notification service 120 can identify a notification multiplexing channel 160 based on the channel identifier 147, and can multiplex notifications 158 generated in response to the API call using the subscription identifier 141. This enables the notification service 120 to return notifications 158 for the forwarded subscription request to the appropriate gateway notification service 120 for the subscribing user and client device 109.

In step 406, the notification service 120 can subscribe to a target publisher service 132. For example, the notification service 120 can identify the notification API call as provided by the client device 109, and received in the forwarded subscription request. The notification service 120 can identify the target publisher service 132 based on the service identifier 137 in the forwarded subscription request, and provide the notification API call to the target publisher service 132. The target publisher service 132 can identify a user and security context based on a user identifier 138 and can filter notifications 158 in view of these factors and the service permissions data 135.

In step 409, the notification service 120 can multiplex notifications by subscription identifiers 141. The target publisher service 132 can return user-specific notifications 158 to the notification service 120. The notification service 120 can also receive and identify additional notifications 158 that are assigned to a notification multiplexing channel 160 mapped to the channel identifier 147.

In step 412, the notification service 120 can transmit multiplexed notifications 158 using the notification multiplexing channel 160. The multiplexed notifications 158 can include notifications 158 from multiple target publisher services 132 on the target node 106, and can correspond to multiple different users. The multiplexed notifications 158 can be multiplexed according to subscription identifiers 141. This can allow the gateway notification service 120 to demultiplex the notifications 158 once received, and provide them to an appropriate destination.

Figure 5:
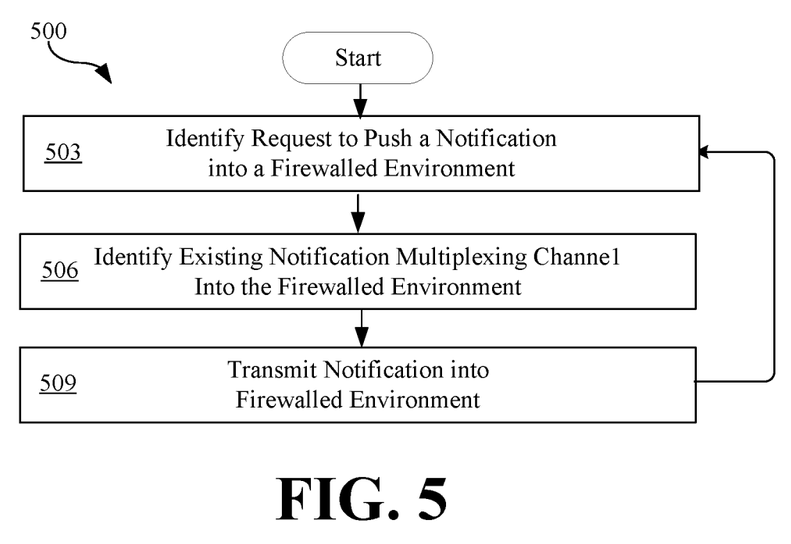
FIG. 5 is a flowchart illustrating another example of functionality implemented by various embodiments of the present disclosure.

FIG. 5 shows a flowchart 500 illustrating functionality implemented by various embodiments of the present disclosure. The flowchart 500 describes the operation of a set or network of notification services 120. While the flowchart 500 is described from the perspective of an off-premises notification service 120 on an off-premises node 106, functionalities discussed can be provided by other components including other notification services 120.

In step 503, the off-premises notification service 120 can identify a request to push a notification 158 into a firewalled environment. For example, the notification service 120 can identify a request to push a notification 158 to an on-premises node 106 inside a firewall. The firewall can forbid or prevent calling on-premises nodes 106 within the firewall from the Internet. The request can identify a target on-premises node 106 as well as a user identifier 138.

In step 506, the off-premises notification service 120 can identify an existing notification multiplexing channel 160 that communicates into the firewalled environment or behind the firewall. For example, the off-premises notification service 120 can identify a notification multiplexing channel 160 between the off-premises node 106 and an on-premises node 106.

In step 509, the off-premises notification service 120 can transmit the notification 158 into the firewalled environment. For example, the off-premises notification service 120 can create or identify a subscription identifier 141 for the notification 158, and transmit the notification using the identified notification multiplexing channel 160. If there are additional notifications 158 for this notification multiplexing channel 160, the off-premises notification service 120 can multiplex the notification 158 along with additional notifications 158, and can transmit the multiplexed notifications 158. The user identifier 138 can be associated with a client device 109 or a session-based notification channel. This can enable the on-premises notification service 120 and can push the notification 158 to an appropriate client device 109.

Several software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 116, hypervisor 126, other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of several technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or several interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable mediums include solid-state drives or flash memory. Further, any logic or application described herein, can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A system comprising:
   at least one computing device comprising at least one processor and at least one data store;
   machine readable instructions stored in the at least one data store, wherein the instructions, when executed by the at least one processor, cause the at least one computing device to at least:
   receive, by a gateway notification service executed by a gateway node computing device, a subscription request for a subscription to a target service, the subscription request comprising a user identifier, a node identifier of a target node computing device, and a service identifier of the target service;
   generate a subscription identifier for the subscription to the target service;
   establish a session-based channel between the gateway node computing device and a computing device that generates a user interface, wherein the subscription request is received from the computing device;
   establish a notification multiplexing channel between the gateway node computing device and the target node computing device;
   transmit, from the gateway notification service to a notification service executed by the target node computing device, a forwarded subscription request comprising: the user identifier, the service identifier, the subscription identifier, and a channel identifier;
   identify, by the gateway notification service, a multiplexed stream of notifications received through the notification multiplexing channel;
   demultiplex, by the gateway notification service, the multiplexed stream of notifications based at least in part on a plurality of subscription identifiers, wherein the subscription identifier is one of the plurality of subscription identifiers, and the subscription identifier is unique to a combination of parameters comprising: the user identifier, the service identifier, and the node identifier of the target node computing device, wherein the target node computing device executes a particular instance of the target service among a plurality of instances of the target service that are executed using different nodes, and the particular instance of the target service is targeted using the node identifier and the service identifier; and
   push at least one notification to the computing device using the session-based channel, wherein the at least one notification specifies the subscription identifier.

2. The system of claim 1, wherein the notification multiplexing channel utilizes a WebSocket protocol.

3. The system of claim 1, wherein the subscription request comprises a notification API call comprising the user identifier.

4. The system of claim 1, wherein the forwarded subscription request comprises a notification API call comprising the user identifier.

5. The system of claim 4, wherein the subscription identifier and the channel identifier are passed as parameters.

6. The system of claim 1, wherein the gateway notification service and the notification service comprise respective ones of a plurality of notification management services corresponding to a plurality of node computing devices.

7. The system of claim 1, wherein the notification multiplexing channel comprises notifications corresponding to multiple different subscription identifiers, wherein the multiple different subscription identifiers correspond to at least one of: multiple different user identifiers, and multiple different service identifiers.

8. A method comprising:
   receiving, by a notification service executed by a first node computing device, a subscription request for a subscription to a service executed by the first node computing device, the subscription request comprising: a user identifier, a service identifier of the service, a subscription identifier, and a channel identifier, wherein the subscription identifier is unique to a combination of parameters comprising: the user identifier, the service identifier, and a node identifier of the first node computing device, wherein the first node computing device executes a particular instance of the service among a plurality of instances of the service that are executed using different nodes, and the particular instance of the service corresponds to the node identifier and the service identifier;
   subscribing to the service based on the subscription request;
   identifying a plurality of notifications corresponding to at least one of a plurality of subscriptions to a plurality of services executed by the first node computing device; and
   transmitting, through a notification multiplexing channel between the first node computing device and a second node computing device, a multiplexed stream of the plurality of notifications, wherein the multiplexed stream comprises at least one notification corresponding to the subscription identifier.

9. The method of claim 8, wherein the notification multiplexing channel utilizes a WebSocket protocol.

10. The method of claim 8, wherein the service filters notifications based at least in part on a security context for the user identifier.

11. The method of claim 8, wherein the subscription request comprises a notification API call comprising the user identifier.

12. The method of claim 11, wherein the subscription request is forwarded from the second node computing device.

13. The method of claim 12, wherein the subscription identifier and the channel identifier are passed as parameters of at least one of the notification API call and the subscription request.

14. The method of claim 8, wherein the notification multiplexing channel comprises notifications corresponding to multiple different subscription identifiers, wherein the multiple different subscription identifiers correspond to at least one of: multiple different user identifiers, and multiple different service identifiers.

15. A non-transitory computer-readable medium comprising machine readable instructions, wherein the instructions, when executed by at least one processor, cause at least one computing device to at least:
 transmit, from a first notification service executed by a first node computing device to a second notification service executed by a second node computing device that further executes a particular instance of a plurality of instances of a publisher service, a notification API call comprising: a user identifier and a service identifier, wherein a subscription identifier and a channel identifier are passed as parameters;
 receive at least one notification through a notification multiplexing channel between the first node computing device and the second node computing device, wherein the notification multiplexing channel comprises a plurality of notifications multiplexed based at least in part on multiple different subscription identifiers, and the notification multiplexing channel corresponds to the channel identifier, wherein a subscription identifier of the multiple subscription identifiers is unique to a combination of parameters comprising: the user identifier, the service identifier, and a node identifier of the second node computing device, wherein the particular instance of the publisher service is targeted using the node identifier and the service identifier;
 identify, from the plurality of notifications, at least one notification corresponding to the subscription identifier; and
 transmit the at least one notification to a client computing device associated with the user identifier.

16. The non-transitory computer-readable medium of claim 15, wherein a channel between the client computing device and the first node computing device is identified based at least in part on the subscription identifier.

17. The non-transitory computer-readable medium of claim 16, wherein the channel between the client computing device and the first node computing device utilizes a WebSocket protocol.

18. The non-transitory computer-readable medium of claim 15, wherein the notification multiplexing channel utilizes a WebSocket protocol.

19. The non-transitory computer-readable medium of claim 15, wherein the at least one notification is transmitted to the client computing device through a session-based notification channel.

20. The non-transitory computer-readable medium of claim 15, wherein the instructions, when executed by the at least one processor, cause the at least one computing device to at least:
 determine that there is no existing notification multiplexing channel between the first node computing device and the second node computing device; and
 establish the notification multiplexing channel between the first node computing device and the second node computing device, wherein a notification service maintains the notification multiplexing channel as a single notification channel between the first node computing device and the second node computing device.

* * * * *